United States Patent Office 2,729,604
Patented Jan. 3, 1956

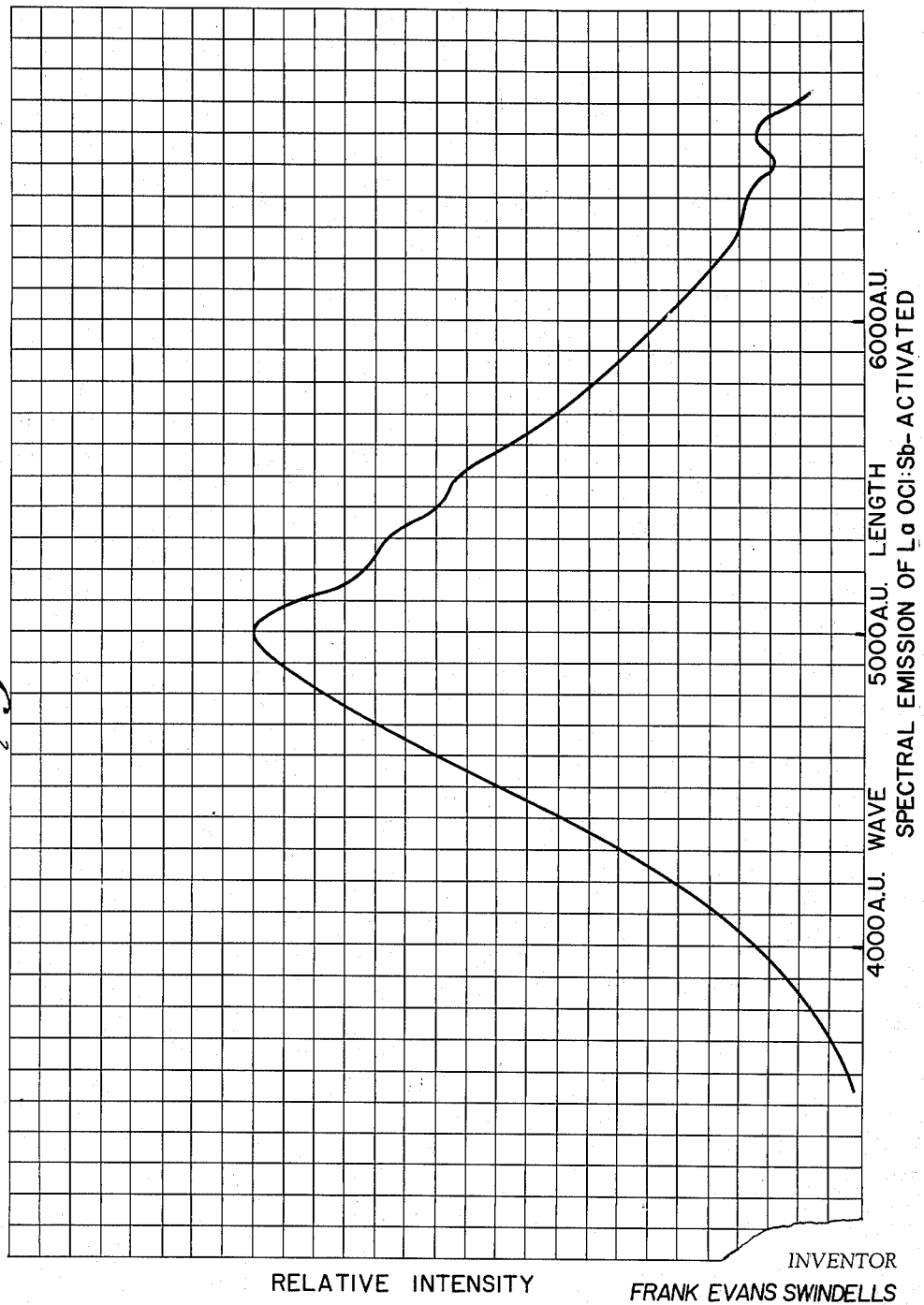

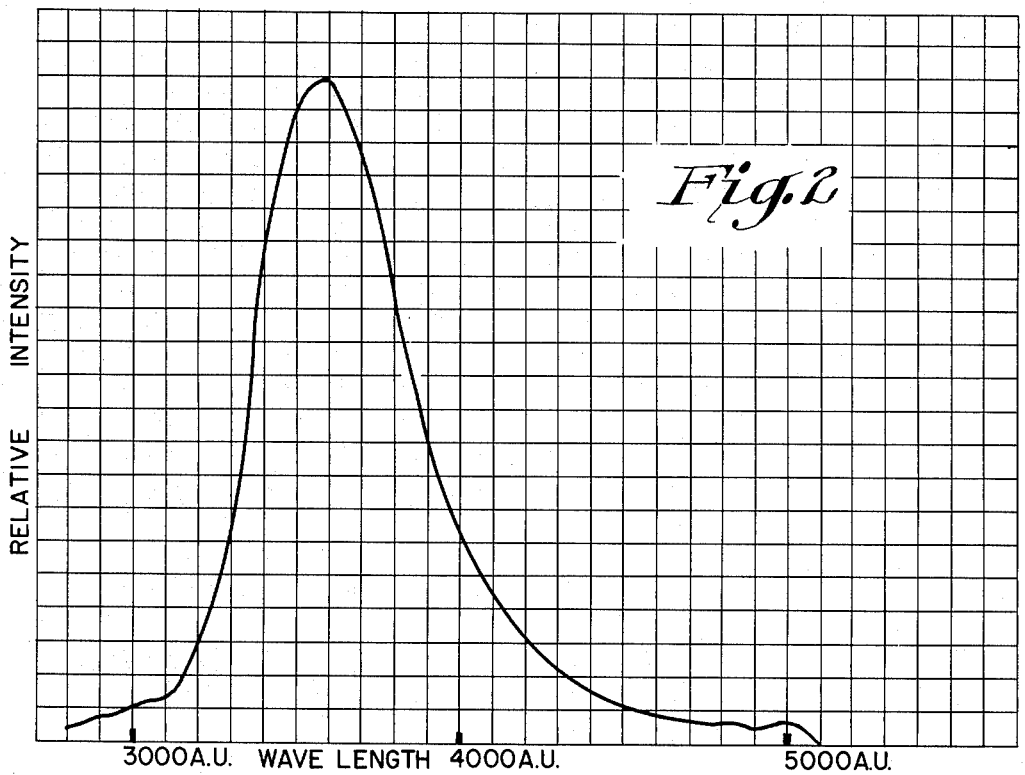
SPECTRAL EMISSION OF La O Cl: Bi— ACTIVATED
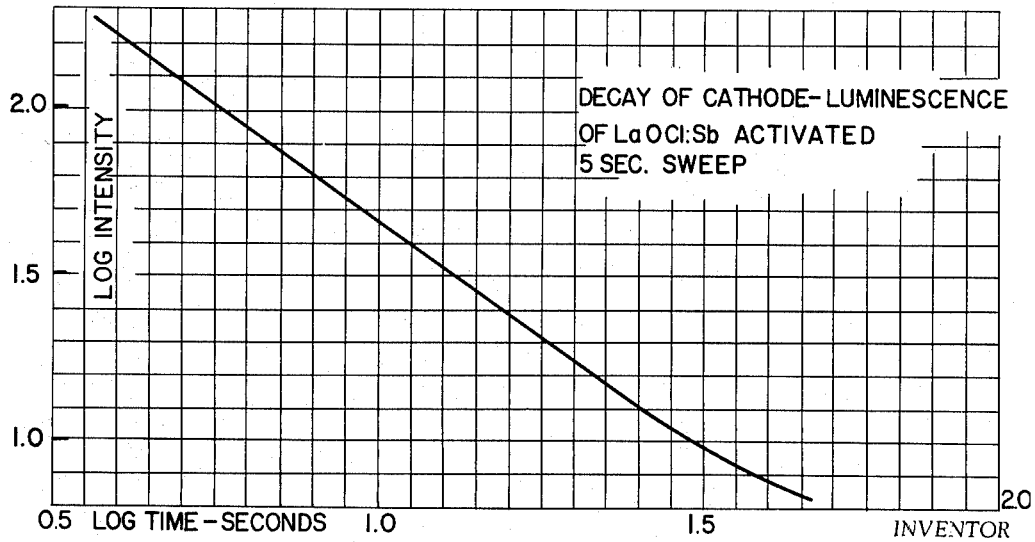
*Fig. 3*
INVENTOR
FRANK EVANS SWINDELLS
BY *Lynn Barrett Morris*
ATTORNEY

2,729,604

LANTHANUM OXYCHLORIDE PHOSPHORS AND THEIR PREPARATION

Frank Evans Swindells, Maplewood, N. J., assignor to E. I. du Pont de Nemours and Company, Wilmington, Del., a corporation of Delaware Application March 23, 1953, Serial No. 344,121

13 Claims. (Cl. 252—301.4)

This invention pertains to lanthanum oxychloride phosphors. More particularly it pertains to bismuth- and antimony-activated lanthanum oxychloride phosphors and to their preparation.

Various lanthanum compounds are known to have luminescent properties but to the best of applicant's knowledge they have not enjoyed any commercial success utilizing such properties. Many of these known compounds are salts of organic acids and/or contain water of crystallization which makes them unsuitable to withstand the high temperature heating necessary to make phosphors useful in high vacuum tube manufacture. Infrared phosphors are known that have been made from lanthanum oxysulfide activated with a double activator consisting of europium coupled with various other heavy metals and indium coupled with copper or such metals. These infrared phosphors have limited technical uses.

It has been found that lanthanum oxychloride can be activated with either antimony or bismuth to form efficient phosphors which are useful in electron discharge tubes. The proportion of the antimony activator may vary from 0.001 to 0.1 atom Sb per mol of lanthanum oxychloride. The proportion of bismuth activator, likewise, may vary from 0.001 to 0.1 atom Bi per mol of lanthanum oxychloride.

The antimony-activated lanthanum oxychloride phosphors are made by heating the lanthanum oxychloride with the activating antimony compound to a temperature from 300 to 1000° C. and preferably 600° C. to 1000° C. for a period of 1 to 20 hours. The lanthanum oxychloride may be prepared previous to or as a part of the calcining operation wherein the activated phosphor is prepared. The lanthanum oxychloride and/or activating metal oxychloride can be formed in situ from the oxides or carbonates of such metals, and hydrogen chloride or ammonium chloride.

A practical procedure for making an antimony-activated lanthanum oxychloride consists in dissolving lanthanum oxide and antimony trioxide in hydrochloric acid, evaporating the solution to dryness, adding water and evaporating again, heating the dry admixture at a temperature of about 400° C. for about one hour, pulverizing the product, baking the product at 600° C., pulverizing the product, and calcining it for 10 to 120 minutes or longer, at a temperature of 800° C. to 1100° C. or higher. The initial heating and pulverizing steps, while advantageous, can be eliminated and the last step only used. Afterwards the product can be ground and screened.

The antimony-activated lanthanum oxychloride phosphors obtained from the foregoing processes and containing the above amounts of antimony are advantageous in that upon excitation by ultraviolet light, they have strong bright blue emission characteristics extending into the near ultraviolet region of the spectrum. Very little phosphorescence can be detected visually. Upon excitation by cathode rays a bright fluorescence, greenish-white in color, is obtained that exhibits strong and persistent phosphorescence.

Bismuth-activated lanthanum oxychloride phosphors are made in like manner in the same amounts and under the same temperature conditions by substituting the corresponding activating bismuth compound, e. g., bismuth oxychloride, bismuth oxide, bismuth carbonate, etc., in place of the activating antimony compound. The bismuth-activated lanthanum oxychloride phosphors so produced have weak bluish fluorescence when excited by light of 2537 A. but upon excitation with cathode rays show strong emission in the blue and near ultraviolet regions of the spectrum.

The novel characteristics of the new activated lanthanum oxychloride phosphors are also shown in the accompanying drawing, which forms a part of this specification, wherein:

Fig. 1 is a graph of the spectral emission of antimony-activated lanthanum oxychloride, excited by cathode rays, Fig. 2 is a graph of the spectral emission of bismuth-activated lanthanum oxychloride, excited by cathode rays, Fig. 3 is a graph of the decay characteristics of antimony-activated lanthanum oxychloride, following excitation by cathode rays. Since the graphs have legends they are self-explanatory and require no further description.

The invention will be further illustrated but is not intended to be limited by the following examples.

EXAMPLE I

Lanthanum oxide (6.5 gm.) and 0.28 gm. of antimony trioxide were dissolved in 35 ml. of 1–1 hydrochloric acid, evaporated to dryness, 5 ml. water was added and evaporated. The mass was then baked for one hour at 400° C., pulverized and screened through 200-mesh nylon bolting cloth, calcined for one hour at 600° C., then pulverized and calcined for one hour at 1000° C. The product had a strong greenish-white fluorescence when excited by cathode rays, with strong phosphorescence, and a moderately strong blue fluorescence when excited by 2537 A. ultraviolet.

EXAMPLE II

The same procedure as in Example I was followed, except that 0.46 gm. of bismuth trioxide replaced the antimony trioxide. The product had a moderately strong blue fluorescence when excited by cathode rays.

EXAMPLE III

Lanthanum oxychloride (3.6 gm.) was ground with 0.17 gm. antimony oxychloride and 5 ml. water in a mortar, then evaporated to dryness. The dry product was ground to a powder, calcined 16 hours at 600° C., reground and calcined one hour at 1000° C. The product had essentially the same properties as that prepared according to Example I.

EXAMPLE IV

The same procedure as in Example III was followed with the substitution of 0.26 gm. of bismuth oxychloride for the antimony oxychloride and resulted in a product similar to that of Example II.

EXAMPLE V

Lanthanum oxide (3.25 gm.), 0.14 gm. of antimony trioxide, 3 gm. of ammonium chloride and 10 ml. of water were ground together, the water then evaporated and the mixture heated one hour at 400° C. The resulting mass was ground and calcined for one hour at 1000° C. The product was similar to that obtained in Example I.

These lanthanum oxychloride phosphors are stable in moist air and may be used in electron discharge tubes including television, oscillograph and radar tubes.

An advantage of the present invention is that it provides a new group of phosphors to the art. Because of their unique properties they are not only useful in the above tubes but will find application where similar emission characteristics are desired. They can be blended with other phosphors to produce mixed color emissions. The bismuth-activated lanthanum oxychloride has rapid decay characteristics which give utility to the phosphor. The antimony-activated lanthanum oxychloride has a slow decay rate and is useful where such properties are desired.

A primary advantage of the products is their rather high efficiency when excited by cathode rays. Still other advantages are that the starting materials are stable and available and the processes are simple and do not require any special equipment.

What is claimed is:

1. A lanthanum oxychloride phosphor activated by a metal taken from the group consisting of antimony and bismuth.

2. A lanthanum oxychloride phosphor activated by a metal taken from the group consisting of antimony and bismuth, in an amount of 0.001 to 0.1 atom of said elements per mol of lanthanum oxychloride.

3. An antimony-activated lanthanum oxychloride phosphor containing 0.001 to 0.1 atom of antimony per mol of said oxychloride.

4. A bismuth-activated lanthanum oxychloride phosphor containing 0.001 to 0.1 atom of bismuth per mol of said oxychloride.

5. The process of making a lanthanum oxychloride phosphor which comprises heating lanthanum oxychloride with an activating metal compound therefor wherein said metal is taken from the group consisting of antimony and bismuth, to a temperature from 300° C. to 1000° C. for a period of at least one hour.

6. The process of making a lanthanum oxychloride phosphor which comprises heating lanthanum oxychloride with an activating bismuth compound therefor to a temperature from 600° C. to 1000° C. for a period of at least one hour.

7. The process of making a lanthanum oxychloride phosphor which comprises heating lanthanum oxychloride with an activating antimony compound therefor to a temperature from 600° C. to 1000° C. for a period of at least one hour.

8. The process of making a lanthanum oxychloride phosphor which comprises heating lanthanum oxychloride with antimony oxychloride, in activating amounts of 0.001 to 0.1 atom of antimony per mol of lanthanum oxychloride, to a temperature from 600° C. to 1100° C. for a period of at least one hour.

9. The process of making a lanthanum oxychloride phosphor which comprises heating lanthanum oxychloride with bismuth oxychloride, in activating amounts of 0.001 to 0.1 atom of bismuth per mol of lanthanum oxychloride, to a temperature from 600° C. to 1100° C. for a period of at least one hour.

10. The process of making a lanthanum oxychloride phosphor which comprises admixing lanthanum oxychloride, antimony oxychloride, in activating amounts of 0.001 to 0.1 atom of antimony per mol af lanthanum oxychloride, and water, evaporating the water, reducing the dry admixture to a powder, heating the latter at about 600° C. for about 16 hours, reducing the product to a fine powder and calcining the powder at 800° C. to 1100° C. for about one hour.

11. The process of making a lanthanum oxychloride phosphor which comprises admixing lanthanum oxychloride, bismuth oxychloride, in activating amounts of 0.001 to 0.1 atom of bismuth per mol of lanthanum oxychloride, and water, evaporating the water, reducing the dry admixture to a powder, heating the latter at about 600° C. for about 16 hours, reducing the product to a fine powder and calcining the powder at 800° C. to 1100° C. for about one hour.

12. The process of making a lanthanum oxychloride phosphor which comprises dissolving lanthanum oxide and antimony trioxide, in activating amounts of 0.001 to 0.1 atom of antimony per mol of lanthanum oxychloride, in hydrochloric acid, evaporating the solution to dryness, heating the powder at about 400° C. for about one hour, reducing the mass to a fine powder, heating the latter for about one hour at 600° C., reducing the product to a powder and calcining the powder for a period of about one hour at about 1000° C.

13. The process of making a lanthanum oxychloride phosphor which comprises dissolving lanthanum oxide and bismuth trioxide, in activating amounts of 0.001 to 0.1 atom of bismuth per mol of lanthanum oxychloride in hydrochloric acid, evaporating the solution to dryness, heating the powder at about 400° C. for about one hour, reducing the mass to a fine powder, heating the latter for about one hour at 600° C., reducing the product to a powder and calcining the powder for a period of about one hour at about 1000° C.

References Cited in the file of this patent

UNITED STATES PATENTS 2,567,769    Head  ---------------- Sept. 11, 1951